(12) United States Patent
Minagawa (10) Patent No.: US 10,452,818 B2
(45) Date of Patent: Oct. 22, 2019

(54) LICENSE MANAGEMENT SYSTEM (71) Applicant: CANON KABUSHIKI KAISHA, Tokyo (JP)

(72) Inventor: Tomonori Minagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 15/416,554

(22) Filed: Jan. 26, 2017

(65) Prior Publication Data

US 2017/0220779 A1  Aug. 3, 2017

(30) Foreign Application Priority Data

Jan. 29, 2016 (JP) ................... 2016-016365

(51) Int. Cl.
H04L 29/06 (2006.01)
G06F 21/10 (2013.01)
G06F 21/12 (2013.01)

(52) U.S. Cl.
CPC ............ *G06F 21/105* (2013.01); *G06F 21/10* (2013.01); *G06F 21/121* (2013.01)

(58) Field of Classification Search
None
See application file for complete search history.

(56) References Cited

U.S. PATENT DOCUMENTS

| | | | |
|---|---|---|---|
| 5,745,879 A | 4/1998 | Wyman | |
| 2001/0011253 A1* | 8/2001 | Coley | G06F 21/10 705/59 |
| 2002/0194010 A1* | 12/2002 | Bergler | G06Q 10/10 705/310 |
| 2003/0037237 A1* | 2/2003 | Abgrall | G06F 21/53 713/166 |
| 2004/0039594 A1* | 2/2004 | Narasimhan | G06F 21/10 705/1.1 |
| 2007/0179899 A1 | 8/2007 | Hase | |
| 2007/0299845 A1 | 12/2007 | Tokunaga | |
| 2009/0133128 A1* | 5/2009 | Uchikawa | G06F 21/10 726/27 |
| 2009/0133131 A1* | 5/2009 | Cronce | G06Q 30/06 726/28 |
| 2010/0057703 A1* | 3/2010 | Brandt | G06F 21/10 707/E17.014 |
| 2011/0066721 A1* | 3/2011 | Shinomiya | G06F 21/10 709/224 |
| 2011/0125655 A1* | 5/2011 | Chiyo | G06F 21/10 705/310 |

FOREIGN PATENT DOCUMENTS

JP          07-200492 A          8/1995

* cited by examiner

*Primary Examiner* — Shin-Hon (Eric) Chen
(74) *Attorney, Agent, or Firm* — Canon U.S.A., Inc., IP Division (57) ABSTRACT

According to an exemplary embodiment of the present invention, in a case where a first start request is received, an application determines whether a license management unit has already acquired a license, and in a case where the application determines that the license management unit has not yet acquired the license, the application acquires a license from a license server and switches the application to a state where a user can use the application. Then, in a case where the license management unit has not yet been started, the application makes a second start request to start license management unit.

12 Claims, 9 Drawing Sheets

LICENSE MANAGEMENT SYSTEM

BACKGROUND OF THE INVENTION

Field of the Invention

The present invention relates to a license management system.

Description of the Related Art

As a method for permitting a client to use a paid application, there is a floating method. The floating method is a method in which a local license server pools a certain number of licenses (as many licenses as can be simultaneously used) in advance and temporarily lends a license to a client, thereby allowing the client to temporarily use an application. A floating license managed by the floating method is returned to the local license server if each client finishes using an application corresponding to the floating license. Thus, another client acquires the returned license and thereby can use the same application. If the time period in which each client uses an application is shifted using such a floating license, more clients than the number of pooled licenses can use the application. It is desirable that the floating license should be held uninterruptedly during work and returned promptly after the work. Thus, generally, the floating license is used in such a manner that the license is acquired when the application is started, and the license is returned when the application is ended (when a process is ended).

In the publication of Japanese Patent Application Laid-Open No. 07-200492, if a start request to start a client application is made, a license management unit on a client side communicates with a license server. If the number of users of corresponding software is less than the number of licenses, the license server permits the use of the corresponding software. If the use of the corresponding software is permitted, the license management unit executes the application. In the publication of Japanese Patent Application Laid-Open No. 07-200492, if a plurality of client applications is present in a client, the license management unit distinguishes each application by an application identification (ID). Then, using a use counter provided for each application ID, the license management unit determines whether the number of users reaches the number of licenses.

In the publication of Japanese Patent Application Laid-Open No. 07-200492, if a plurality of applications is present, each application is managed based on a different license. Thus, there can be an application that can be used and an application that cannot be used, depending on the usage state of the license (i.e., whether the number of clients using each application reaches the upper limit of the number of licenses).

On the other hand, in a suite product in which a plurality of applications cooperates with each other, it is necessary to allow the use of the entire group of applications. However, the technique discussed in the publication of Japanese Patent Application Laid-Open No. 07-200492 individually manages a plurality of applications based on respective application IDs and individually acquires licenses for the applications. Thus, depending on the usage state, there is a case where the entire group of applications cannot be used. Thus, this technique is not suitable for a product in which a plurality of applications cooperates with each other.

In response, the applicant considers providing in a client a license management unit operating by a process independent of the process of each application, and causing the license management unit to acquire a single license from a license server, thereby allowing the use of a plurality of applications related to each other.

For the following reasons (1) to (3), it is desirable to manage a plurality of applications based on a single license, manage a license acquired by a single license management unit (a single license management application), and cause the license management unit to operate by a process independent of the processes of the plurality of applications.

(1) It is easier to simplify the configuration in which a plurality of applications included in a suite product is managed based on a single license, than the configuration in which each of a plurality of applications included in a suite product is managed based on a different license.

(2) If the license management unit is not provided, and each application acquires and returns a license, the traffic between a client and a server increases, which is not desirable. Further, it is also possible to employ a method in which the license management unit is not provided, an application started first acquires a license from a server, and another application cooperates with the application started first, thereby managing the license. In this case, however, interprocess communication occurs between the application started first and another application. This has an adverse influence on the performance and also complicates the process for transferring the license after the application started first is ended. Thus, it is realistic that the license management unit manages the acquisition and the return of a license in a unified manner.

(3) A floating license is consumed so long as an application is operating. Thus, because of this characteristic of the floating license, the floating license is often managed not in a file but in a memory. This is because an update process, which occurs frequently, can be performed in a short time, and when the application crashes, the floating license can automatically expire. Thus, it is desirable that the license management unit should not operate as a part of each application, but should operate by a process independent of the process of each application.

For the above reasons, it is possible that the license management unit for operating by an independent process acquires and returns a license, and each application cooperates with the license management unit when the application is started and ended.

If, however, any application is to be started when the license management unit is not operating (i.e., when a license has not yet been acquired), the application first starts the license management unit, which operates by an independent process, and then acquires a license via the license management unit. In this case, the start of the license management unit and interprocess communication between the application and the use right management unit occur. Thus, the response when the application is started is worse than that in the case where the application itself directly communicates with the license server and acquires a license. Particularly, in an application that frequently starts and ends (e.g., a gadget application that starts according to the dragging and dropping of a file onto an icon and automatically ends after a predetermined process is executed), an adverse influence on the performance is noticeable. This reduces convenience for a user.

SUMMARY OF THE INVENTION

According to an aspect of the present invention, a license management system includes a client apparatus that executes a license management program for functioning as a license management unit and a plurality of applications, and a license server, wherein the client apparatus executes one of the applications to perform: in a case where a first start request to start the one of applications is received, first determining whether the license management unit has already acquired a license; in a case where it is determined in the first determining that the license management unit has not yet acquired a license, first acquiring a license from the license server; in a case where it is determined in the first determining that the license management unit has already acquired a license, or in a case where a license has been acquired from the license server in the first acquiring, switching the one of applications for which the first start request is received to a state where a user can use the one of applications; and in a case where the license management unit has not yet been started, making a second start request to start the license management unit, and wherein the client apparatus further executes the license management program to perform: according to the second start request, starting the license management unit; and second acquiring a license from the license server, and while the one of application is being executed, periodically updating the acquired license.

Further features of the present invention will become apparent from the following description of exemplary embodiments with reference to the attached drawings.

DESCRIPTION OF THE EMBODIMENTS

Figure 1:
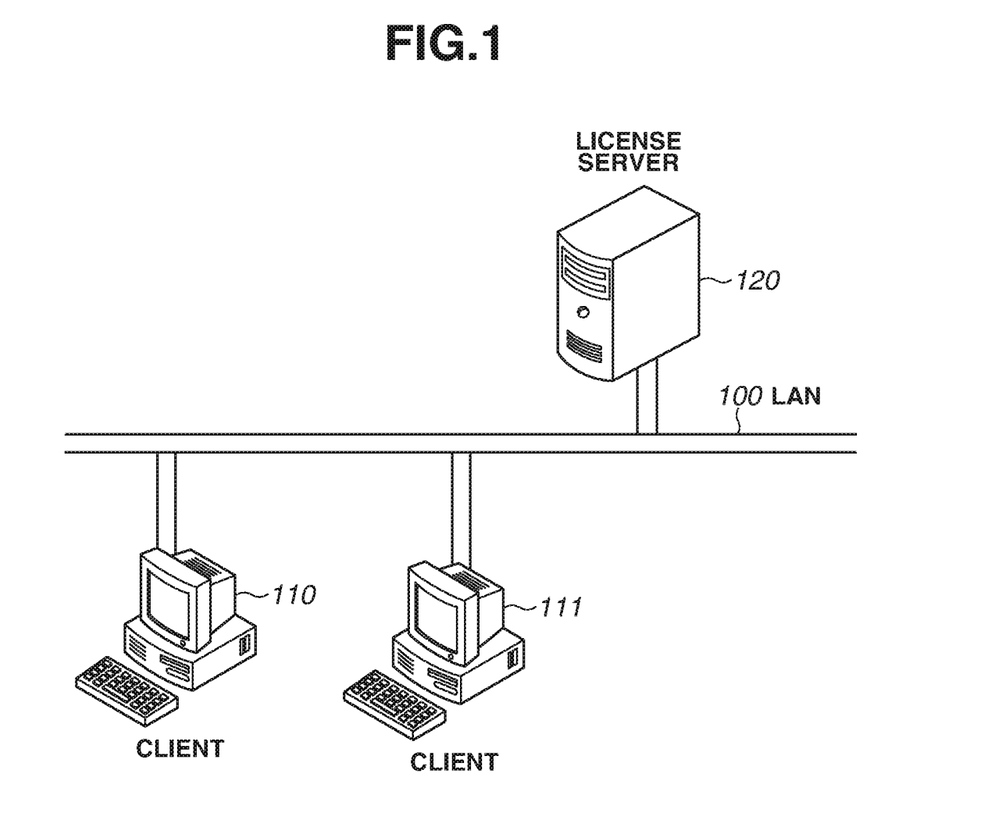
FIG. 1 is an example of a system configuration.

A first exemplary embodiment is described below. FIG. 1 is a diagram illustrating the configuration of a floating license management system according to an exemplary embodiment of the present invention. The floating license management system according to the present exemplary embodiment is a system where a license server and a plurality of clients (client apparatuses) can communicate with each other via a network.

A local area network (LAN) 100 is a network that enables clients 110 and 111 and a license server 120 to communicate with each other. This network is not limited to a LAN, and may be a wide area network (WAN).

In the client 110 (or 111), an application 300 is installed. The use of the application 300 is permitted using a license, whereby use restriction on part or all of the function of the application 300 is lifted. Consequently, the application 300 can be used.

The license server 120 is a license server for issuing a floating license for the application 300 operating in the client 110 (or 111) and holds one or more licenses in advance.

The floating license (hereinafter, simply the "license") is what the license server 120 temporarily lends to a client requesting a license. Each client borrows the license from the license server 120 when using the application 300, and thereby can use the application 300. If finishing using the application 300, the client returns the license to the license server 120, thereby shifting the time period in which the application 300 is used. Thus, even another client can use the same application based on the same license. The license issued by the license server 120 may be in a file format, or may be binary data or a license flag. Any method may be employed so long as the method can securely handle a license between the license server 120 and the client 110 (or 111). Hereinafter, regardless of a medium or a method, the process in which the client 110 (or 111) obtains a license from the license server 120 is referred to as "license acquisition", and conversely, the process in which the client 110 (or 111) returns a license to the license server 120 is referred to as "license return".

In the present exemplary embodiment, an example is illustrated where the application 300 installed in the client 110 operates based on a floating license acquired from the license server 120.

<Example of Hardware Configuration>

Figure 2:
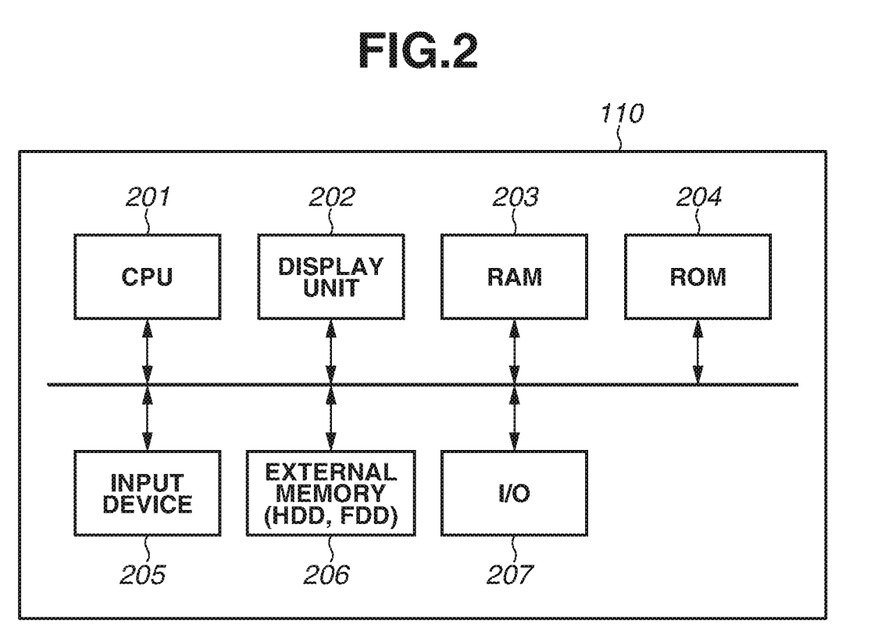
FIG. 2 is an example of a hardware configuration of each of a client and a license server.

FIG. 2 is a diagram illustrating an example of hardware configuration of each of the clients 110 and 111 and the license server 120 illustrated in FIG. 1. In FIG. 2, an input device 205 that receives an operation input by a user through a keyboard or a pointing device is provided. Further, a display unit (display) 202 that feeds back visual output information to the user is included. Further, as storage devices for storing various programs for causing a computer (a central processing unit (CPU) 201) to execute processes described below and execution information, a random-access memory (RAM) 203, a read-only memory (ROM) 204, and an external memory 206 such as a hard disk drive (HDD) or a floppy (registered trademark) disk drive (FDD) are provided. Input/output (I/O) 207 is an interface device for communicating with an external device. The client 110 and the license server 120 communicate with each other via the I/O 207 as the interface device.

Processing described in the present exemplary embodiment is achieved by loading a program stored in the ROM 204 or the external memory 206 into the RAM 203, and by the CPU 201 executing the program.

<Examples of Software Configurations>

Figure 3:
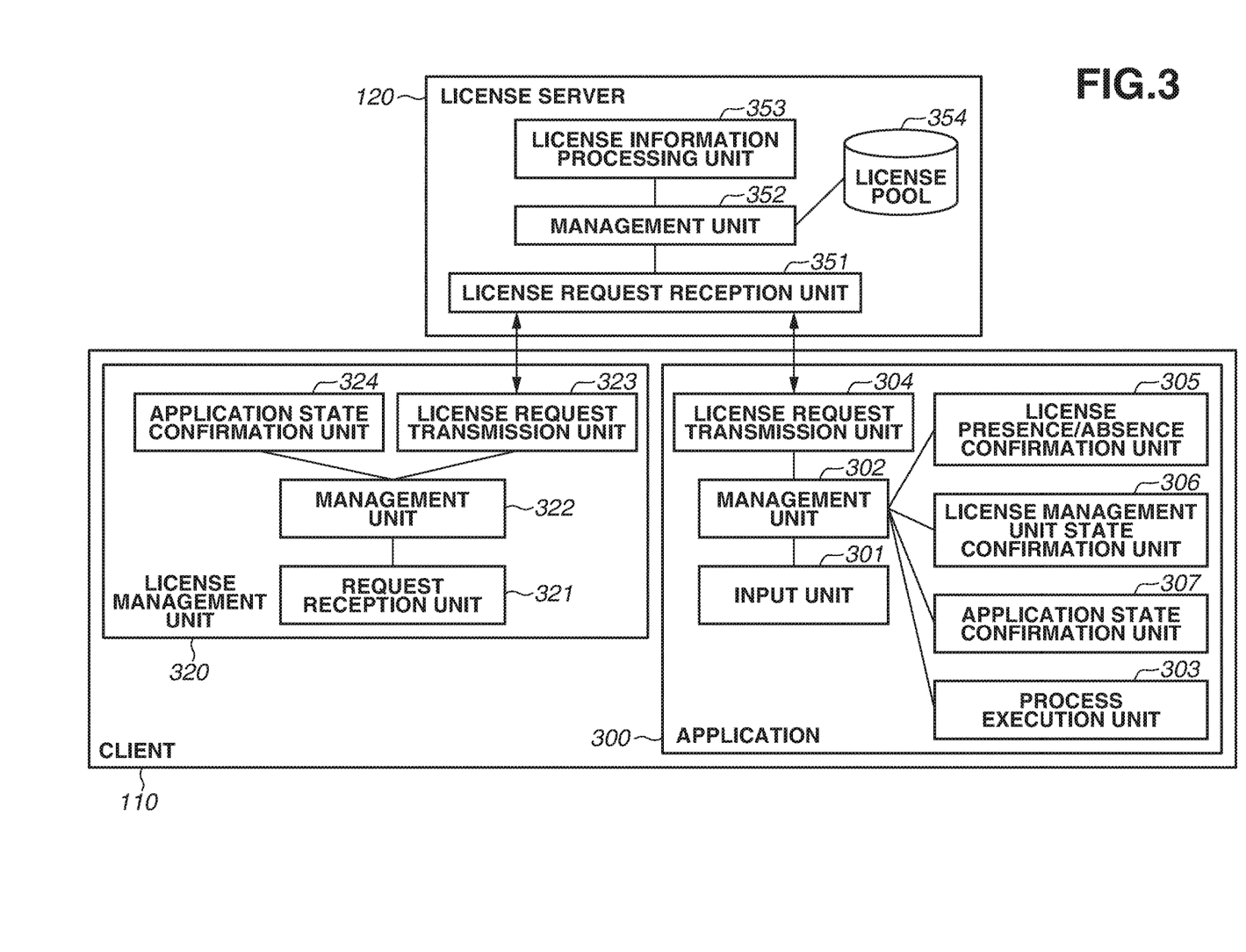
FIG. 3 is an example of software configurations of the client and the license server.

FIG. 3 is a diagram illustrating examples of software configurations of the client 110 (or 111) and the license server 120.

The CPU 201 of the client 110 executes the application (application program) 300, thereby functioning as an input unit 301, a management unit 302, a process execution unit 303, a license request transmission unit 304, a license presence/absence confirmation unit 305, a license management unit state confirmation unit 306, and an application state confirmation unit 307.

The input unit 301 receives an operation from the user and notifies the management unit 302 of an input request. If the input unit 301 receives a start request to start the application 300, the management unit 302 determines that a license for using the application 300 is required. Then, the management unit 302 commands the license presence/absence confirmation unit 305 to confirm whether a license management unit 320 of the client 110 has already acquired the license (i.e., whether the license is present in the client 110). As will be described below, the determination of whether the license management unit 320 has already acquired the license is made by confirming the state of a "license flag". If it is determined that the license management unit 320 has already acquired the license, the management unit 302 switches the application 300 to an executable state (the state where the user can use the application 300). If the license management unit 320 has not yet acquired the license, the management unit 302 commands the license request transmission unit 304 to transmit a request to acquire the license.

The license request transmission unit 304 directly connects to the license server 120 and makes a license acquisition request to the license server 120. At this time, the license request transmission unit 304 sends, along with the license acquisition request, a client identifier capable of uniquely identifying a client. As the client identifier, a media access control (MAC) address, the serial number of a hardware part, or a calculation value created by combining the MAC address and the serial number can be used. Although the details of the license server 120 will be described below, normally, if there remains a license that can be used, the acquisition of the license is successful. In this case, a license having a validity period T2 (e.g., 10 minutes) is obtained. The license acquired by the application 300 is stored in a memory space used by the application 300. The license request transmission unit 304 notifies the management unit 302 of the success or failure of the acquisition of the license, and the expiration date of the license in the case of success. If the acquisition of the license is successful, the management unit 302 commands the process execution unit 303 to switch the application 300 to an executable state (the state where the user can use the application 300). The process execution unit 303 switches the application 300 to an executable state so that a work instruction can be received from the user through the input unit 301. If receiving a request to execute a function according to an instruction given through the input unit 301, or a request to perform processing (document editing or printing) on an operation screen, then similarly, the management unit 302 commands the process execution unit 303 to execute the content of the request. If the acquisition of the license is failed in the license request transmission unit 304, the management unit 302 performs control so that the application 300 is not started according to the start request. In this case, the management unit 302 may notify the user operating the client 110 of this state by a message.

At this time, if the start of the application 300 is successful, the management unit 302 enables another application related to the application 300 (e.g., another application included in an office suite product) to recognize that the application 300 including the management unit 302 is operating. For example, it is possible to employ a method for storing, in a shared resource for interprocess communication, a flag indicating that the application 300 is operating. Although the method for storing the flag is not limited, hereinafter, for convenience, the presence or absence of an application that is operating is represented by the on/off state of a flag. In other words, the state where the application 300 is operating is represented as "an application flag is on", and the state where the application 300 is not operating is represented as "the application flag is off", so that another application can recognize each state. Further, the application flag is present individually for each of a plurality of applications. A processing unit for confirming the application flag knows in advance the storing locations of the flags of all applications as confirmation targets and thereby can distinguish and check these flags, where necessary.

If the start of the application 300 is successful, then further, to continue updating the license, the management unit 302 commands the license management unit state confirmation unit 306 to confirm the operating state of the license management unit 320. As will be described below, the operating state of the license management unit 320 is determined by confirming the state of a "license management unit flag". If the "license management unit flag" indicates that the license management unit 320 has already been started, the license acquisition process by the application 300 is ended. If the confirmation result indicates that the license management unit 320 has not yet been started, the management unit 302 requests the license management unit 320 to start.

Next, the end of the application 300 is described. If the input unit 301 receives an end request to end the application 300, then before ending the application 300, the management unit 302 determines whether it is necessary to return the license. The management unit 302 commands the application state confirmation unit 307 to determine whether there is another application that is included in the suite product and is operating, except for the application 300 including the management unit 302. The presence or absence of an application that is operating is determined by confirming the state of an "application flag" as described above.

If, as a result of the determination by the application state confirmation unit 307, there is another application that is operating, the client 110 still requires the license for the suite product. Thus, the management unit 302 ends the application 300 including the management unit 302 without returning the license. At this time, the management unit 302 sets the application flag of the application 300 to off so that another application can recognize that the application 300 enters a non-operating state. If, as a result of the determination by the application state confirmation unit 307, there is no other application that is operating, the client 110 does not require the license. Thus, the management unit 302 instructs the license management unit 320 to return the license to the server 120, and ends the application 300 including the management unit 302. At this time, to return the license, the management unit 302 makes an end request to end the license management unit 320. Further, similarly to the above case, the management unit 302 sets the application flag of the application 300 to off.

Next, the license management unit 320, which is achieved on the client 110, will be described. The CPU 201 of the client 110 executes a program for achieving the license management unit 320, thereby functioning as a request reception unit 321, a management unit 322, a license request transmission unit 323, and an application state confirmation unit 324.

If the application 300 makes a start request to start the license management unit 320, the request reception unit 321 receives the start request and notifies the management unit 322 of the start request. If starting the license management unit 320, the management unit 322 enables each application to recognize that the license management unit 320 is operating. For example, it is possible to employ a method for storing a flag indicating that the license management unit 320 is operating. The flag indicating that the license management unit 320 has already been started may be stored using the mechanism of a shared resource for interprocess communication. Alternatively, an interface for inquiring of the license management unit 320 may be provided so that the flag can be confirmed. The method for confirming the operating state of the license management unit 320 is not limited. Hereinafter, for convenience, in any method, the state where the license management unit 320 has already been started is represented as "a license management unit flag is on", and the state where the license management unit 320 has not yet been started is represented as "the license management unit flag is off", so that the management unit 302 of the application 300 can recognize each state.

At each predetermined time interval T1 (e.g., every 3 minutes), the management unit 322 of the license management unit 320 commands the application state confirmation unit 324 to confirm whether there is an application that is operating. The presence or absence of an application that is operating is determined by confirming the state of an "application flag" as described above. If the application state confirmation unit 324 determines that there is an application that is operating, then to extend the validity period of a license, the management unit 322 commands the license request transmission unit 323 to update the license. If the application state confirmation unit 324 determines that there is no application that is operating, the management unit 322 determines that it is not necessary to maintain the license. Then, the management unit 322 commands the license request transmission unit 323 to return the license. Further, subsequently, the management unit 322 ends the license management unit 320.

If receiving a license update command, the license request transmission unit 323 connects to the license server 120 and requests the update of a license. At this time, the license request transmission unit 323 sends, along with the request, a client identifier capable of uniquely identifying a client. Although the license server 120 will be described below, if the license server 120 receives the request from a client permitted to use applications, normally, the update of the license is successful. At this time, the license request transmission unit 323 acquires an updated license having the validity period T2 (e.g., 10 minutes). The acquired license is stored in a memory space used by the license management unit 320. From the second time onward, the existing license is overwritten with a new license. This process is referred to as an "update of a license". The validity of the license is maintained so long as the update of the license is successful.

While the license acquired for the first time by the application 300 is valid, it seems that the application 300 and the license management unit 320 redundantly manage two licenses. However, this is not a problem for the following reasons. Firstly, as will be described below, in response to a license acquisition request from the same client, the license server 120 returns an updated license for the license held by the same client. Although the storage locations are different, the license held by the license management unit 320 is an updated license for the license held by the application 300. Thus, a license is not unnecessarily consumed. Secondly, the license held by the application 300 is used only to permit the start of the first application 300 and is not used to permit the use of another application other than the first application 300. Further, the license held by the application 300 is not updated and expires after a certain time period (after the lapse of the validity period T2 from the acquisition of the license). Thus, only the license held by the license management unit 320 remains, and the above redundancy is solved.

If the license request transmission unit 323 fails to connect to the license server 120 or fails to acquire the license from the license server 120, the license is not acquired or updated. The above failure occurs, for example, in a case where the client 110 is disconnected from the network, or the license server 120 goes down.

The license request transmission unit 323 notifies the management unit 322 of the success or failure of the acquisition of the license, and the expiration date of the license in the case of success. At this time, if the acquisition of the license is successful, the management unit 322 enables each application to recognize that the license has already been acquired. Although it is possible to employ various methods as the method for enabling each application to recognize that the license has already been acquired, the method is not limited here. For example, it is possible to employ a method for providing an interface for inquiring of the license management unit 320, or a method for indicating that the license has already been acquired, using the mechanism of a shared resource for interprocess communication. Hereinafter, for convenience, in any method, the state where the license management unit 320 has already acquired the license is represented as "a license flag is on", and the state where the license management unit 320 has not yet acquired the license is represented as "the license flag is off", so that each application can recognize each state.

If the acquisition of the license by the license request transmission unit 323 continues to fail, and as a result, if the management unit 322 determines that the license has reached the expiration date (if the time T2 has elapsed since the license has been acquired for the last time), the right to use the acquired license expires. At this time, the management unit 322 may perform some expiration process. For example, the management unit 322 may perform processing for prompting the end of an application, displaying a message indicating the expiration to the user, or stopping a periodical update. Further, the management unit 322 may perform nothing so that only an application that is operating can be used until the application is ended. Even in a case where the acquisition of the license by the license request transmission unit 323 is failed several times, if the reacquisition of the license is successful, the validity of the license is maintained.

Next, the process for ending the license management unit 320 is described. If the request reception unit 321 receives an end request, the management unit 322 returns the license and then ends the license management unit 320 including the management unit 322. At this time, additionally, the management unit 322 sets the license flag to off and further sets the license management unit flag to off.

Next, the license server 120 is described. The CPU 201 of the license server 120 executes a server program, thereby functioning as a license request reception unit 351, a management unit 352, a license information processing unit 353, and a license pool 354.

The license server 120 stores one or more licenses in the license pool 354 in advance. In this system, in response to a request from each client, a license (a floating license) is lent to the client up to the number of licenses stored in the license pool 354. The license information processing unit 353 manages at least a license count (the number of remaining licenses) and a client permitted to use applications. The initial value of the license count is the total number of licenses purchased for the license server 120.

The license request reception unit 351 receives a license acquisition request or a license return request from the application 300 or the license management unit 320 and notifies the management unit 352 of the license acquisition request or the license return request.

If the received request is a license acquisition request, the management unit 352 sends a client identifier received together with the request to the license information processing unit 353 and inquires whether a license has already been issued (lent) to a client corresponding to the client identifier. If a license has already been issued to the client, the request is a license update request. Thus, the management unit 352 determines that the acquisition of the license is successful. Then, the management unit 352 returns a success status and a license updated with the validity period T2 to the license request reception unit 351. At this time, the license information processing unit 353 updates the expiration date of the updated license in association with the client identifier.

If, on the other hand, in the confirmation of the client identifier by the license information processing unit 353, a license has not yet been issued to the corresponding client, the management unit 352 determines that the request is a new license acquisition request. At this time, the management unit 352 confirms the license count. The license count indicates the number of remaining licenses that can be issued. If the license count is equal to or greater than 1, this means that there still remains a license that can be issued. In this case, the management unit 352 commands the license information processing unit 353 to subtract 1 from the license count and returns a success status and a license prepared with the validity period T2 to the license request reception unit 351. Further, the license information processing unit 353 records the client identifier and manages the client identifier together with the expiration date of the license. If, on the other hand, the license count confirmed by the license information processing unit 353 is 0, this means that there remains no more license that can be issued. In this case, the management unit 352 returns a failure status to the license request reception unit 351.

The license request reception unit 351 returns a success or failure status, and a license in the case of success, to the client 110.

As described above, for a client permitted to use applications, the license server 120 reissues a license of which the expiration date is updated (the license count does not decrease). For a client not yet permitted to use applications, the server 120 subtracts 1 from the license count and then issues a license. The former process is a process performed in response to a license update request from the license management unit 320. The latter process is a process performed in response to a license acquisition request from the application 300 when initially started.

Next, a case is described where the license request reception unit 351 receives a license return request. At this time, if receiving information of a returned license via the license request reception unit 351, the management unit 352 commands the license information processing unit 353 to increase the license count by 1 and deletes the client identifier of a client managed as that permitted to use applications.

There is also a case where a license update request from the client 110 to which a license has been issued is interrupted, and the license has reached its expiration date in this state. The management unit 352 periodically confirms whether there is a license that has reached its expiration date. If there is a license that has reached its expiration date, the management unit 352 determines that the license has expired. Then, the management unit 352 commands the license information processing unit 353 to perform processing similar to that when a license is returned. Consequently, a license automatically expires after the time T2 since the license has been updated for the last time. Then, the license becomes available for lending again.

With reference to examples of flowcharts in FIGS. 4A, 4B, 5A, and 5B and time charts in FIGS. 6 to 9, a description is given below of a series of operations including the acquisition, the periodical update, the return, and the expiration of a floating license.

<Processing Performed by Each Processing Unit when Application Start Request is Made>

Figure 4A:
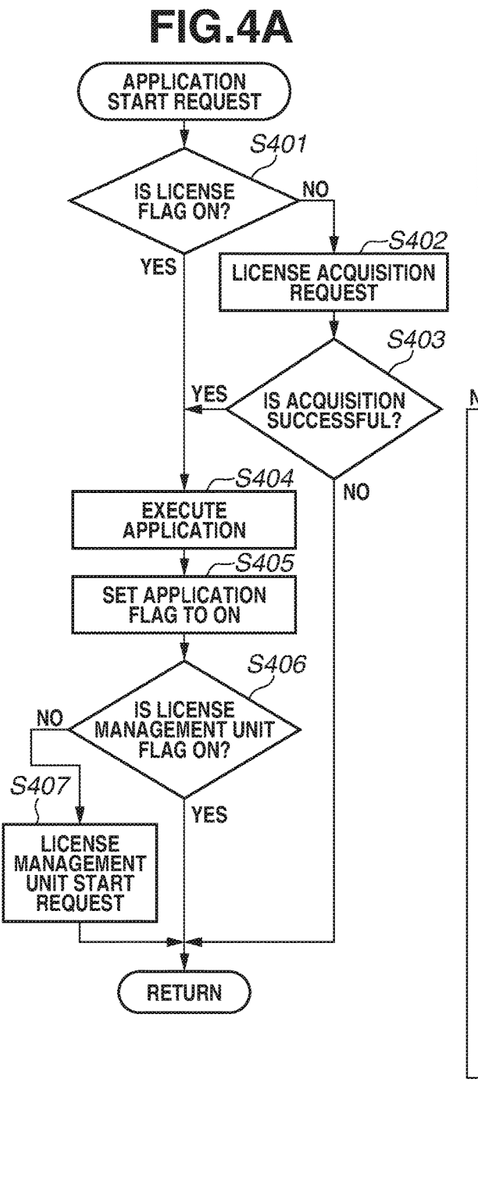
FIGS. 4A and 4B are processing flows performed when an application is started.

First, a description is given of the processing performed by each processing unit regarding a start and a license when an application start request is made by an instruction from the user. FIG. 4A is a flowchart illustrating the processing executed by the application 300 when a start request is received. Further, FIG. 6 is a time chart chronologically illustrating the operation contents of applications and the license management unit 320 of the client 110, the license acquisition state (license flag) of the client 110, and the operation content of the license server 120 when a start request is received.

Figure 6:
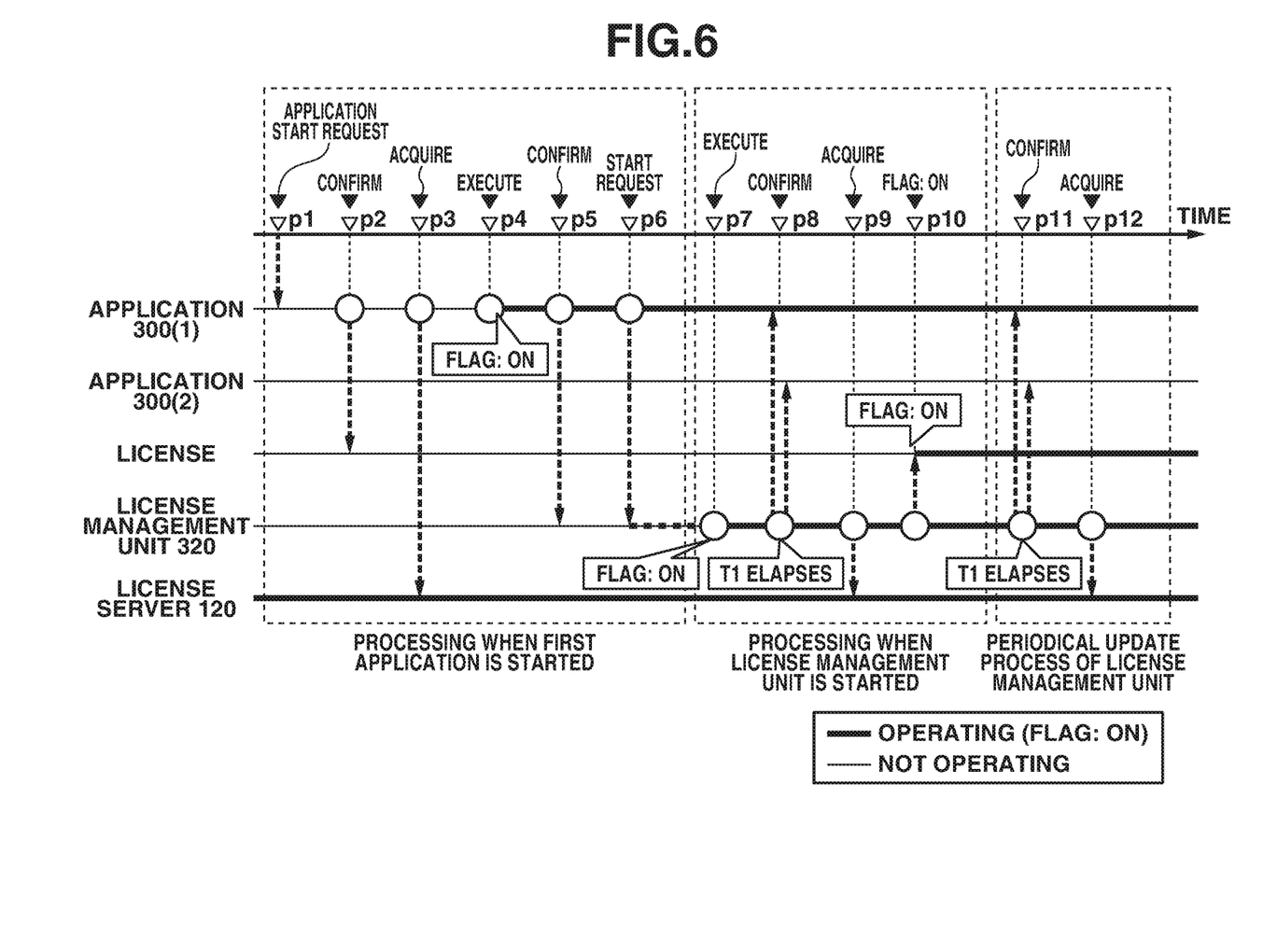
FIG. 6 is an example of a time chart when the application is started.

In FIG. 6, the vertical axis represents elements such as two applications 300 (300(1) and 300(2)), which can operate cooperatively in the client 110, the presence or absence of a license (the on/off state of the license flag), the license management unit 320, and the license server 120. The horizontal axis represents the lapse of time, and each point p indicates the time when each event occurs. A thick line indicates that each element is valid (an application is operating, a license is present, or a corresponding flag is on). Conversely, a thin line indicates that each element is invalid. A circle on a line indicates that some process is performed, or another element is involved. The reason for two applications is to describe processing to be performed in a case where a plurality of applications is involved. Further, each application includes the processing units described in FIG. 3.

If the input unit 301 of the application 300(1) receives a start request based on an instruction from the user (p1), then in step S401, the license presence/absence confirmation unit 305 confirms whether the license flag is on or off (p2).

If the license presence/absence confirmation unit 305 determines in step S401 that the license flag is off (NO in step S401), it is indicated that the license management unit 320 has not acquired a license, and the application 300(1) for which the start instruction is given is an application instructed to start first. In this case, the processing proceeds to step S402, and then in step S402, the license request transmission unit 304 accesses the license server 120 and transmits a license acquisition request to the license server 120 (p3).

In step S403, the management unit 302 determines whether the acquisition of the license is successful. If the determination is YES (the acquisition of the license is successful) (YES in step S403), then in step S404, the management unit 302 switches the application 300(1) to an executable state (the state where the user can use the application 300(1)). Then, in step S405, the management unit 302 sets the application flag to on (p4).

If the determination by the license presence/absence confirmation unit 305 is YES in step S401 (the license flag is on) (YES in step S401), it is indicated that the license management unit 320 has already acquired a license, and the application 300(1) for which the start instruction is given is an application instructed to start second or later. In this case, in step S404, the management unit 302 immediately switches the application 300(1) for which the start instruction is given to an executable state.

In step S406, the license management unit state confirmation unit 306 determines whether the license management unit flag is on or off (i.e., confirms whether the license management unit 320 has already been started) (p5). If the determination is NO in step S406 (the license management unit 320 has not yet been started) (NO in step S406), then in step S407, the management unit 302 makes a start request to start the license management unit 320, and the process for making a start request to start the application 300(1) is completed (p6). If, on the other hand, the determination is YES in step S406 (the license management unit 320 has already been started) (YES in step S406), the process for making a start request to start the application 300(1) is completed. This is the processing performed when the application 300 receives a start request.

Figure 4B:
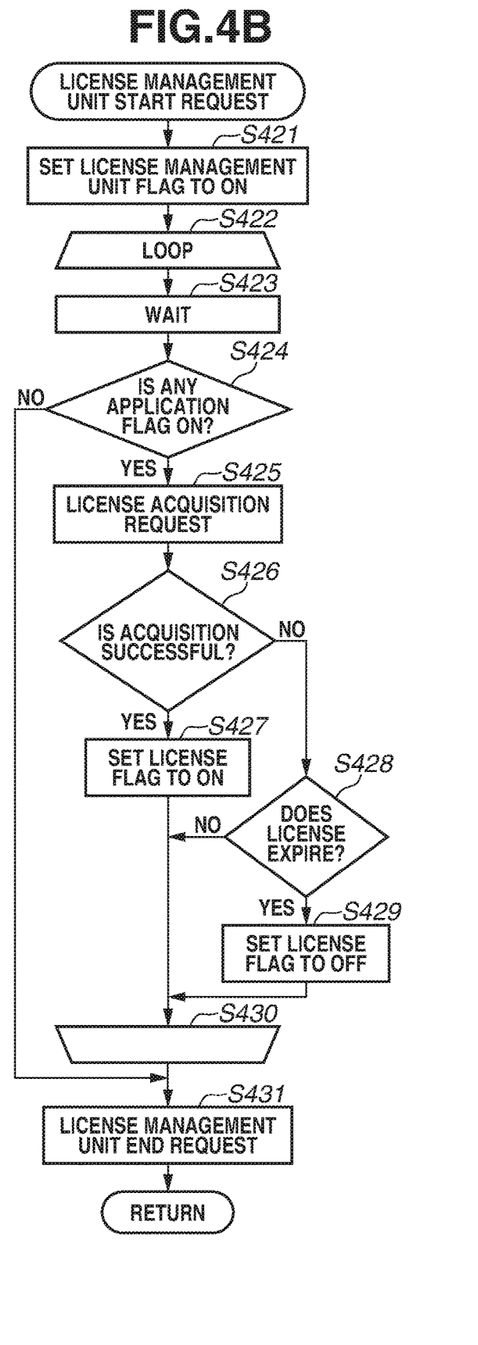

Next, a description is given of the processing performed when the license management unit 320 receives a start request from the management unit 302 of the application 300(1) in step S407. FIG. 4B is a flowchart illustrating the processing executed by the license management unit 320 when receiving a start request. FIG. 4B is described together with the time chart in FIG. 6.

If the request reception unit 321 of the license management unit 320 receives a start request issued in step S407 to start the license management unit 320 (p6), the management unit 322 of the license management unit 320 switches the license management unit 320 to an operating state. Then, in step S421, the management unit 322 sets the license management unit flag to on (p7). If the license management unit flag is set to on, then in another application 300 requested to start from this point onward, the process for starting the license management unit 320 in step S407 is skipped according to the determination in step S406.

Next, in a loop from steps S422 to S430, while either of the applications 300(1) and 300(2) is operating, the management unit 322 executes the process for periodically updating a license. First, in step S423, the management unit 322 waits for the predetermined time interval T1 (3 minutes in the present exemplary embodiment). This is the interval between periodical updates. In step S424, the management unit 322 commands the application state confirmation unit 324 to confirm whether there is an application flag that is on (i.e., whether any application is being executed) (p8). If the determination is YES in step S424 (some application is being executed) (YES in step S424), then in step S425, the license request transmission unit 323 connects to the license server 120 and transmits a license acquisition request to the license server 120 (p9). In step S426, the management unit 322 confirms whether the acquisition of the license is successful. If the determination is YES (the acquisition of the license is successful) (YES in step S426), then in step S427, the management unit 322 sets the license flag to on (p10). If the license flag is set to on, then in another application 300 requested to start from this point onward, another application 300 can be immediately executed (step S404) according to the determination in step S401.

If, on the other hand, the determination is NO in step S426 (the acquisition of the license is failed) (NO in step S426), it is possible that the network is disconnected, or the license server 120 is down. In such a case, the license cannot be updated. Thus, it is necessary to confirm whether the license expires. In step S428, the management unit 322 confirms whether the acquired license has already expired. If the determination is YES (the already acquired license expires) (YES in step S428), then in step S429, the management unit 322 sets the license flag to off. If the determination is NO in step S428 (the already acquired license does not expire) (NO in step S428), the processing proceeds to a loop end in step S430 and therefore returns to step S423. The above periodical update process (the loop from steps S422 to S430) is repeated until all applications capable of operating based on the license end. That is, the processes for waiting for the interval T1 in step S423, confirming the presence or absence of an application that is operating again in step S424 (p11), and transmitting a license request in step S425 (p12) are repeated.

If, on the other hand, the determination is NO in step S424 (there is no application that is being executed) (NO in step S424), then in step S431, the management unit 322 performs the process for ending the license management unit 320. This corresponds to the case where an application that is being executed ceases to be present, and the need to hold the license is eliminated. The details of the end process will be described below. This is the processing performed when the license management unit 320 receives a start request.

A description is given of a case where a start request to start another application 300(2) is made while the application 300(1) is being executed. If the time when the license presence/absence confirmation unit 305 of the application 300(2) performs the process for confirming the presence or absence of a license in step S401 is after p10, the license flag is on. Thus, in step S404, the application 300(2) is immediately switched to an executable state. In this case, it is not necessary to wait for another application such as the license management unit 320 to start, or it is not necessary to perform interprocess communication with another application. Thus, it is possible to quickly start the application 300(2). If the process for confirming the presence or absence of a license (step S401) is performed before p10, the license flag is off. Thus, in step S402, the application 300(2) itself makes a license acquisition request. Then, in step S404, the application 300(2) is switched to an executable state. In this case, it seems that each of the two applications acquires a license and holds the license in a memory space used by the application. As described above, however, from a viewpoint of the license server 120, the license server 120 merely sends an updated license to a single client, and this is not a problem. The license acquired by each application eventually expires, and the application is managed based only on a license acquired by the license management unit 320. As described above, each application can be certainly started, and after a certain time period, the license management unit 320 manages a license in a unified manner.

<Processing of Each Processing Unit when Application End Request is Made>

Figure 5A:
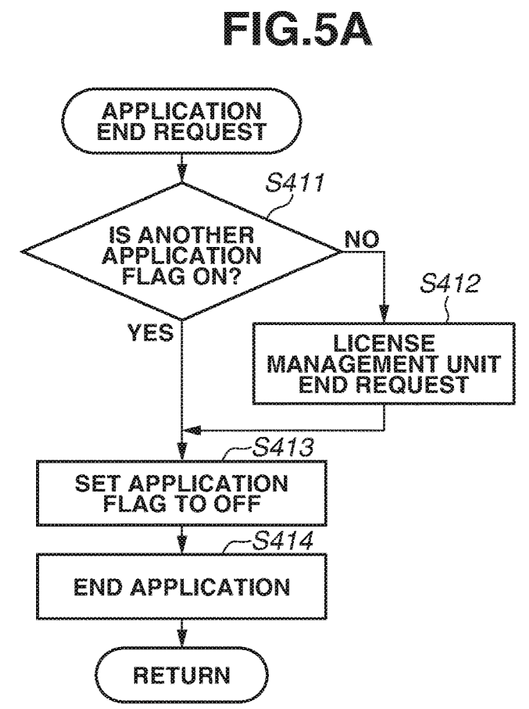
FIGS. 5A and 5B are processing flows performed when the application is ended.
Figure 7:
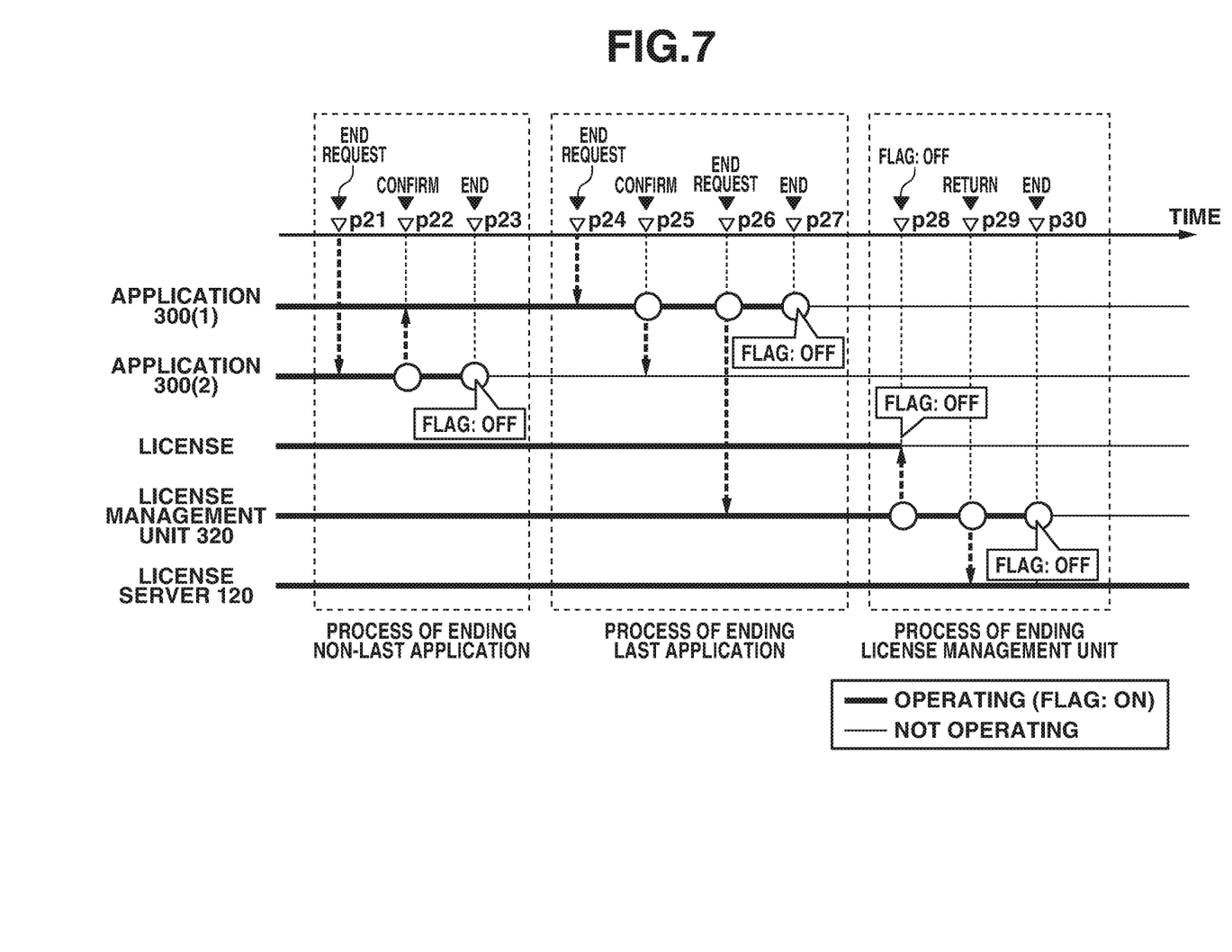
FIG. 7 is an example of a time chart when the application is ended.

Next, a description is given of the processing of each processing unit and the processing regarding a license when an application end request is made by an instruction from the user. FIG. 5A is a flowchart illustrating the processing executed by the application 300 when receiving an end request. Further, FIG. 7 is an example of a time chart chronologically illustrating the operation contents of applications and the license management unit 320 of the client 110, the license acquisition state (the license flag) of the client 110, and the operation content of the license server 120 when an end request is received.

If the input unit 301 of the application 300 receives an end request based on an instruction from the user, then in step S411, the application state confirmation unit 307 confirms whether the application flag of another application is on (i.e., another application is being executed). If the determination is YES in step S411 (there is another application that is being executed) (YES in step S411), it is still necessary to hold a license. Thus, the application 300 is ended without returning the license. In this case, in step S413, the management unit 302 sets the application flag of the application 300 for which the end request is made to off. Then, in step S414, the management unit 302 ends the application 300 for which the end request is made. If, on the other hand, the determination is NO in step S411 (there is no other application that is being executed) (NO in step S411), it is not necessary to hold the license. Thus, in step S412, to end the process for updating the license and return the license, the management unit 302 requests the license management unit 320 to end. Then, the processing proceeds to step S413.

For example, if the application 300(2) receives an end request based on an instruction from the user in the state where both the applications 300(1) and 300(2) are operating (p21), then in step S411, the application 300(2) confirms another application flag (p22). In this case, the application flag of the application 300(1) is on. Thus, in step S413, the application 300(2) sets the application flag of the application 300(2) to off. Then, in step S414, the application 300(2) is ended (p23). If a plurality of applications is operating, processes similar to those at p21 to p23 are performed on the applications other than the application to end last. After that, if the application 300(1) also receives an end request (p24), then in step S411, the application 300(1) confirms another application flag (p25). In this case, there is no other application that is being executed (another application flag is off). Thus, in step S412, the application 300(1) requests the license management unit 320 to end (p26). Then, in step S413, the application 300(1) sets the application flag of the application 300(1) to off. In step S414, the application 300(1) is ended (p27). This is the processing when the application 300 receives an end request.

Figure 5B:
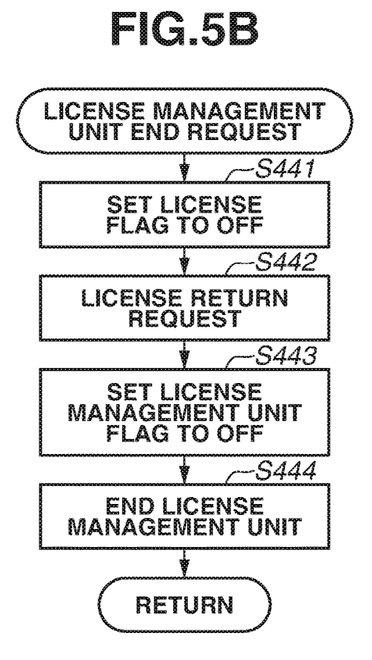

Next, a description is given of the processing performed when the license management unit 320 receives an end request from the management unit 302 of the application 300 in step S412. FIG. 5B is a flowchart illustrating the processing executed by the license management unit 320 when receiving an end request. FIG. 5B is described together with the time chart in FIG. 7.

If the request reception unit 321 of the license management unit 320 receives an end request from the management unit 302 of the application 300 in step S412 (p26), then in step S441, the management unit 322 sets the license flag to off (p28). Next, in step S442, the license request transmission unit 323 transmits a license return request to the license server 120 (p29). Then, in step S443, the management unit 322 sets the license management unit flag to off. In step S444, the management unit 322 ends the license management unit 320 (p30). This is the processing performed when the license management unit 320 receives an end request.

Based on the above, if all applications are ended, a license acquired by the license management unit 320 is returned to the license server 120, the license management unit 320 is ended, and each flag (the application flag, the license flag, and the license management unit flag) is set to off.

Also in a case where an end request to end the license management unit 320 is made in step S431, the processes of steps S441 to S444 are executed.

In this system, as described above, when the first application 300 is started, the application 300 itself acquires a license from the license server 120. If the acquisition of the license is successful, the application 300 is switched to an executable state. With such a configuration, it is possible to save time as compared with the case where an application starts a license management unit, the license management unit acquires a license from a license server and returns the license to the application, and then, the application starts. In other words, it is possible to save the starting time of the license management unit 320, and the communication time between the process of the application 300 and the process of the license management unit 320.

Based on the above, it is possible to shorten the time required to start the first application, thereby improving convenience for the user. Further, after a certain time period, the license management unit 320 manages a license in a unified manner. This facilitates the management of the license.

<Processing of Each Processing Unit when Application Crashes>

Next, a case is considered where the application 300 crashes during its execution. If a license is held even though there is no application 300 that is operating, the opportunities for other users to use the applications are reduced, which is not desirable. In response, with reference to the time chart in FIG. 8, an example is described where if the application 300 in execution crashes and ceases to be present, a license is automatically returned.

Figure 8:
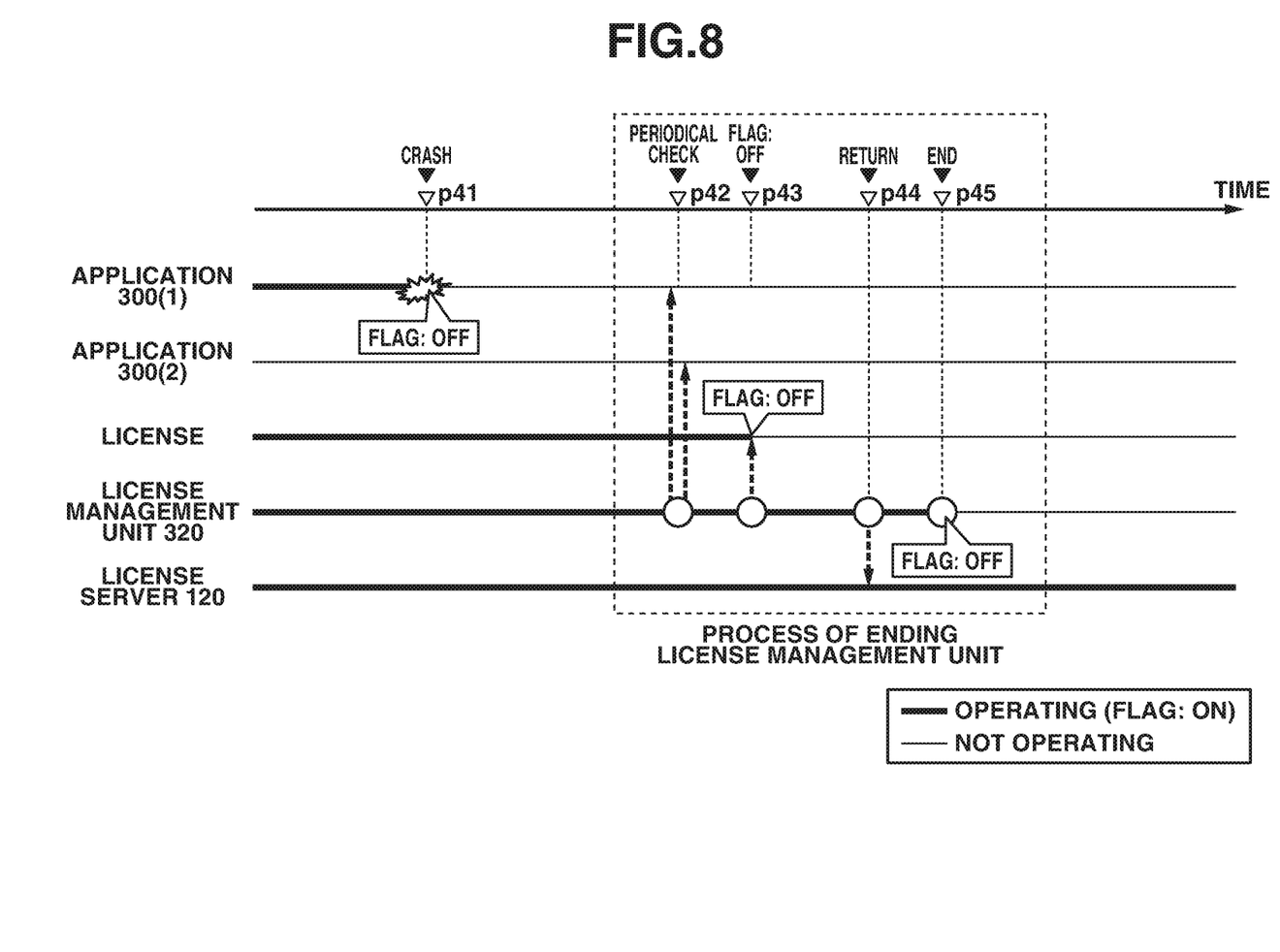
FIG. 8 is an example of a time chart when the application crashes.

If the application 300 crashes, and a process in execution ceases to be present, the application flag is set to off (p41). Next, in step S424, by the periodical update process of the license management unit 320, it is checked whether there is an application 300 in execution (p42). If it is determined that there is no application 300 that is operating (NO in step S424), the processing proceeds to step S431. Then, in step S441, the license flag is set to off (p43). In step S442, the license is returned (p44). In step S443, the license management unit flag is set to off. In step S444, the license management unit 320 is ended (p45).

As described above, in this system, even in a case where the application 300 crashes, then by the periodical update process of the license management unit 320, the process of returning a license is performed within up to a predetermined period from the crash. Consequently, it is possible to reduce unnecessary consumption of a license.

Next, a case is considered where the license management unit 320 crashes. If the license management unit 320 crashes, the license flag is also set to off. Further, if a certain time period elapses, and the expiration date of a license is reached, the actually acquired license expires. In the case of a system where, even if a license expires, an application that is operating can be used until the application is ended, there is no problem with the use of the application that is operating. Further, a case is considered where a start request to start another application is made. When a new application 300 is started, it is determined in step S401 that the license flag is off. Thus, in step S402, the application 300 itself makes a license acquisition request. Before a license expires, normally, the acquisition (update in this case) of the license is successful. After the license expires, the success or failure of the acquisition of the license depends on the number of remaining licenses in the license server 120. If the acquisition of the license is successful, further in step S406, the license management unit state confirmation unit 306 detects that the license management unit 320 has yet not been started. Then, in step S407, the license management unit 320 is started. Consequently, it is possible to restore the license management unit 320 to a normal state.

In this system, as described above, even in a case where the license management unit 320 crashes, it is possible to use an application that is being used, and also start a new application. Thus, convenience for the user is not impaired.

Figure 9:
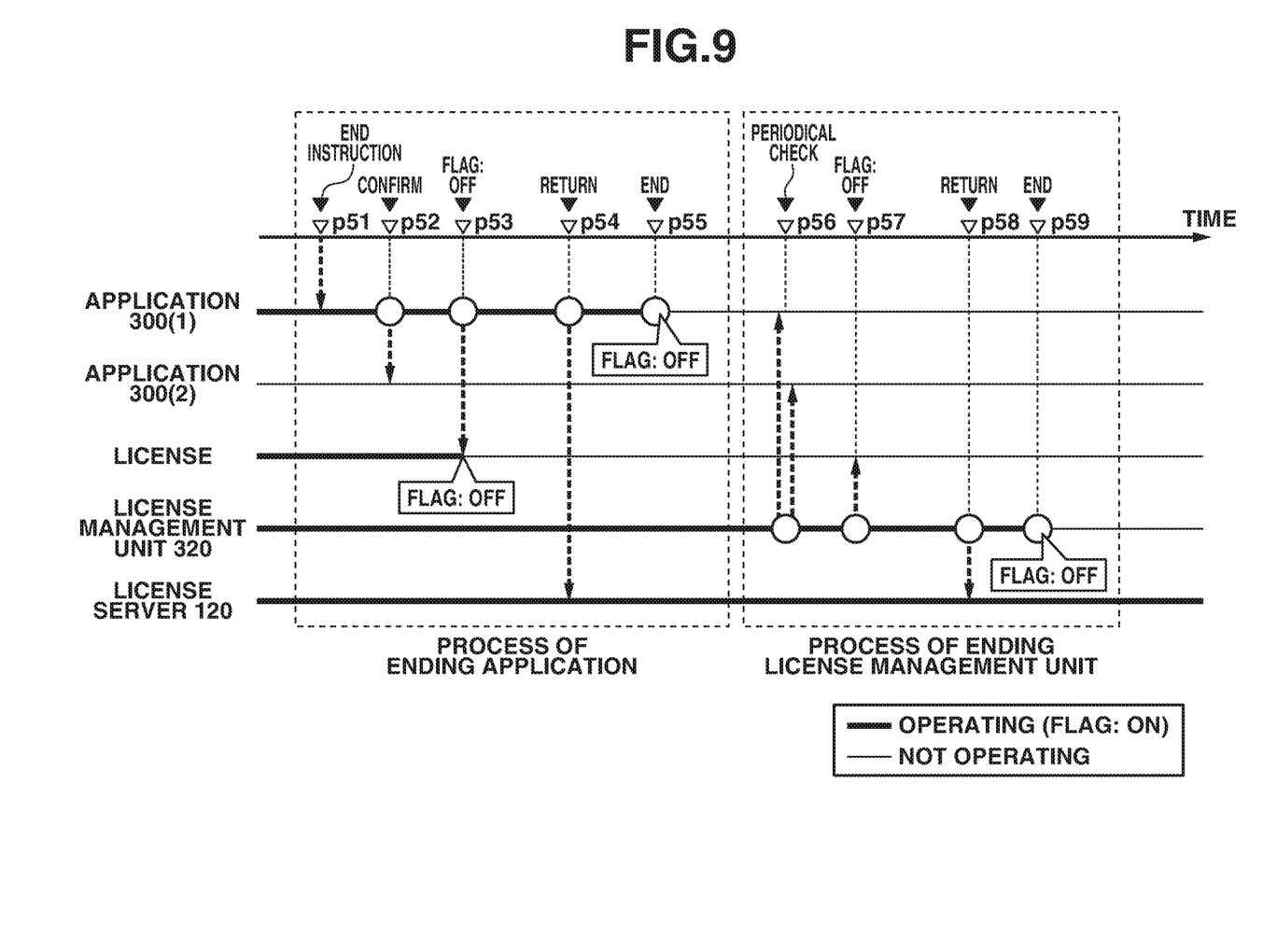
FIG. 9 is an example of a time chart when an application is ended, according to a second exemplary embodiment.

A second exemplary embodiment is described below. Regarding the processing performed when an application end request is made, a processing procedure according to the second exemplary embodiment, which is different from that in FIG. 7, is illustrated. FIG. 9 is a time chart chronologically illustrating the operation content and the state of each processing unit when an end request is received.

If receiving an end request from the user (p51), then in step S411, the application 300(1) confirms the application flag of another application and determines whether there is another application that is being executed (i.e., whether the application 300(1) for which the end instruction is given is the last application) (p52). Next, in step S412, the application 300(1) requests the license flag to be off, instead of requesting the license management unit 320 to end (p53), and further makes a license return request to the license server 120 (p54). Then, in step S413, the application 300(1) sets the application flag to off. In step S414, the application 300(1) is ended (p55).

At this time, in step S424, the license management unit 320 checks the presence of an application by the periodical update process. Then, it is determined that there is no application that is operating (p56). After that, in step S441, the license management unit 320 sets the license flag to off (p57). Then, in step S442, the license management unit 320 returns the license (p58). However, both the processes of steps S441 and S442 are already performed at p53 and p54 and therefore may be skipped. Finally, in steps S443 and S444, the license management unit 320 sets the license management unit flag to off. Then, the license management unit 320 is ended.

In the above manner, according to the second exemplary embodiment, it is also possible to reduce interprocess communication between the process of the application 300 and the process of the license management unit 320.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016365, filed Jan. 29, 2016, which is hereby incorporated by reference herein in its entirety.

What is claimed is:

1. A client apparatus for executing a license management program for functioning as a license manager and a plurality of applications, the client apparatus including at least a processor and at least a memory coupled to the at least the processor and having stored thereon instructions executed by the at least the processor, causing the client apparatus to perform operations including:
determining, by one application among the plurality of applications, in a case where a first start request to start the one of applications is received, whether the license manager has already acquired a license using a license flag;
acquiring, by the one application among the plurality of applications, a license from a license server in a case where it is determined that the license manager has not yet acquired a license;
changing, by the one application among the plurality of applications, the one application into a state where a user can use the one of applications in a case where it is determined that the license manager has already acquired a license;
determining, by the one application among the plurality of applications, after the one application is changed into the state of being useable by the user, whether a status of the license manager is currently in started state; and
transmitting, by the one application among the plurality of applications, a second start request to start the license manager in a case where it is determined by that the license manager is not currently in started status.

2. The client apparatus according to claim 1,
wherein execution of the stored instructions by the at least one processor further causes the client apparatus to perform operations including setting a license flag to on in a case where the license has been acquired from the license server, and
wherein based on whether the license flag is on, it is determined whether the license manager has already acquired a license.

3. The client apparatus according to claim 2,
wherein execution of the stored instructions by the at least one processor further causes the client apparatus to perform operations including:
in a case where a first end request to end the one among the plurality of applications is received, determining whether another application among the plurality of applications is being executed;
in a case where it is determined that another application among the plurality of applications is not being executed, setting the license flag to off and returning the license to the license server; and
ending the one application among the plurality of applications in a case where the first end request to end the one application among the plurality of applications is received, and
wherein the license manager further performs:
periodically determining whether any application is being executed; and
in a case where it is determined in the periodic determination that no application is being executed, ending the license manager.

4. The client apparatus according to claim 1,
wherein execution of the stored instructions by the at least one processor further causes the client apparatus to perform operations including:

in a case where a first end request to end the one of applications among the plurality of applications is received, determining whether another application is being executed;

in a case where it is determined that another application is not being executed, making a second end request to the license manager; and ending the one application among the plurality of applications in a case where the first end request to end the one application among the plurality of applications is received, and wherein the license manager further performs operations including:

according to the second end request, returning the acquired license to the license server; and after the license is returned to the license server, ending the license manager.

5. The client apparatus according to claim 4, wherein execution of the stored instructions by the at least one processor further causes the client apparatus to perform operations including:

in a case where the one application among the plurality of applications for which the first start request is received has been switched to the state where the user can use the one of applications, setting an application flag of the one application among the plurality of applications to on, and wherein based on whether an application flag of another application among the plurality of applications is on, it is determined whether another application is being executed.

6. A non-transitory storage medium storing an application that, when executed by a processor of a client apparatus, causes the processor to perform operations comprising:

acquiring, by a license manager, a plurality of applications and one license for starting the plurality of applications from the license server;

determining, by one application among the plurality of applications, in case where a first start request to start the one application is received, whether the one license has already been acquired by the license manager using a license flag;

acquiring, by the one application among the plurality of applications, the one license from the license server in a case where it is determined that the license has not yet been acquired by the license manager from the license server;

changing, by the one application among the plurality of applications, the one application into a state of being useable by a user in a case where it is determined that the license manager has already acquired the one license from the license server;

determining, by the one application among the plurality of applications, after the one application is changed into the state of being useable by the user, whether a status of the license manager is currently in started state; and transmitting, by the one application among the plurality of applications, a second start request to start the license manager in a case where it is determined by that the license manager is not currently in started status.

7. The non-transitory storage medium according to claim 6, wherein execution of the application program causes the processor to further perform:

in a case where a first end request to end the one of applications among the plurality of applications is received, determining whether another application is being executed;

in a case where it is determined that another application is not being executed, making a second end request to the license manager; and ending the one application among the plurality of applications in a case where the first end request to end the one application among the plurality of applications is received, wherein according to the second end request, the license manager returns the acquired license to the license server, and after returning the license to the license server, the license manager is ended.

8. The non-transitory storage medium according to claim 7, wherein execution of the application program causes the processor to further perform:

in a case where the one application among the plurality of applications for which the first start request is received has been switched to the state where the user can use the one of applications, setting an application flag of the one application among the plurality of applications to on, and wherein based on whether an application flag of another application among the plurality of applications is on, it is determined whether another application is being executed.

9. The non-transitory storage medium according to claim 6, wherein execution of the application program causes the processor to further perform:

in a case where a first end request to end the one among the plurality of applications is received, determining whether another application among the plurality of applications is being executed;

in a case where it is determined that another application among the plurality of applications is not being executed, setting the license flag to off and returning the license to the license server; and ending the one application among the plurality of applications in a case where the first end request to end the one application among the plurality of applications is received, and wherein the license manager periodically determines whether an application is being executed, and in a case where the license manager determines that no application is being executed, the license manager is ended.

10. A license management system, comprising:

a license server that manages one or more licenses;

a client apparatus that acquires one or more licenses from the license server;

at least one processor and at least one memory having stored thereon instructions executed by the at least the processor, causing the client apparatus to perform operations including acquiring, by a license manager, one license for starting the plurality of applications included in the client apparatus from the license server;

determining, by one application among the plurality of applications, in case where a first start request to start the one application is received, whether the one license has already been acquired by the license manager using a license flag;

acquiring, by the one application among the plurality of applications, the one license from the license server in a case where it is determined that the license has not yet been acquired by the license manager from the license server;

changing, by the one application among the plurality of applications, the one application into a state of being useable by a user in a case where it is determined that the license manager has already acquired the one license from the license server;

determining, by the one application among the plurality of applications, after the one application is changed into the state of being useable by the user, whether a status of the license manager is currently in started state; and transmitting, by the one application among the plurality of applications, a second start request to start the license manager in a case where it is determined by that the license manager is not currently in started status.

11. The license management system according to claim 10, wherein execution of the stored instructions by the at least one processor further causes the client apparatus to perform operations including:

acquiring the one license from the license server and periodically update the acquired one license in a case where one application is currently executed.

12. The license management system according to claim 10, wherein the license flag is a flag that indicates whether the license manager has acquired the one license from the license server and is used when the one application determines whether the license management unit has the one license.

* * * * *